US011953789B2

(12) United States Patent
Ishikawa et al.

(10) Patent No.: US 11,953,789 B2
(45) Date of Patent: Apr. 9, 2024

(54) LIQUID CRYSTAL DISPLAY DEVICE INCLUDING A FIRST SPACER IN A HIGHER TRANSPARENCY AREA

(71) Applicant: Japan Display Inc., Tokyo (JP)

(72) Inventors: Tomokazu Ishikawa, Tokyo (JP); Masaru Nakakomi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/455,685

(22) Filed: Nov. 19, 2021

(65) Prior Publication Data

US 2022/0075224 A1 Mar. 10, 2022

Related U.S. Application Data

(63) Continuation of application No. PCT/JP2020/020419, filed on May 22, 2020.

(30) Foreign Application Priority Data

May 24, 2019 (JP) ................................ 2019-097561

(51) Int. Cl.
*G02F 1/1339* (2006.01)
*G02F 1/1333* (2006.01)
(Continued)

(52) U.S. Cl.
CPC .... *G02F 1/13394* (2013.01); *G02F 1/133345* (2013.01); *G02F 1/13338* (2013.01);
(Continued)

(58) Field of Classification Search
CPC ............. G02F 1/13394; G02F 1/13396; G02F 1/133388; G02F 1/133345
See application file for complete search history.

(56) References Cited

U.S. PATENT DOCUMENTS

2006/0262253 A1 11/2006 Teramoto et al.
2017/0123452 A1 5/2017 Evans, V et al.
(Continued)

FOREIGN PATENT DOCUMENTS

JP   2006-343728 A   12/2006
JP   2008-209563 A    9/2008
WO  WO 2018/216545 A1 11/2018

OTHER PUBLICATIONS

International Search Report dated Jul. 21, 2020 in PCT/JP2020/020419 filed on May 22, 2020, citing documents AP-AQ therein, 2 pages.
(Continued)

*Primary Examiner* — Paisley L Wilson
(74) *Attorney, Agent, or Firm* — Maier & Maier, PLLC (57) ABSTRACT

According to one embodiment, a liquid crystal display device includes a first substrate, a second substrate, a facing area, a liquid crystal layer, and a first spacer. The facing area includes a first area for displaying an image, a second area, and a frame-shaped frame area. The second substrate includes a light-shielding layer. The second area is an area having higher transparency than transparency of the first area. The liquid crystal layer is located in the second area, the frame area, and the first area. The first spacer is located in the second area and is provided on the first substrate or the second substrate.

8 Claims, 9 Drawing Sheets

(51) Int. Cl.
*G02F 1/1335* (2006.01)
*G02F 1/1343* (2006.01)

(52) U.S. Cl.
CPC .. *G02F 1/133388* (2021.01); *G02F 1/133512* (2013.01); *G02F 1/13392* (2013.01); *G02F 1/13396* (2021.01); *G02F 1/13439* (2013.01)

(56) References Cited

U.S. PATENT DOCUMENTS

2020/0174301 A1* 6/2020 Tien .................... H04M 1/0264
2020/0236259 A1 7/2020 Nakamura et al.
2020/0310186 A1* 10/2020 Ina .................... G02F 1/133514

OTHER PUBLICATIONS

Office Action dated Nov. 1, 2022, in corresponding to Japanese Application No. 2019-097561, 8 pages.

* cited by examiner

LIQUID CRYSTAL DISPLAY DEVICE INCLUDING A FIRST SPACER IN A HIGHER TRANSPARENCY AREA

CROSS-REFERENCE TO RELATED APPLICATIONS

This application is a Continuation Application of PCT Application No. PCT/JP2020/020419, filed May 22, 2020 and based upon and claiming the benefit of priority from Japanese Patent Application No. 2019-097561, filed May 24, 2019, the entire contents of all of which are incorporated herein by reference.

FIELD

Embodiments described herein relate generally to a liquid crystal display device.

BACKGROUND

In recent years, display devices having various shapes have been proposed. In one example, a liquid crystal display device having a light shielding portion between a video display portion and a transparent display portion is disclosed. In another example, a liquid crystal display device having a display portion and a transparent portion overlapping a camera is disclosed.

DETAILED DESCRIPTION

In general, according to one embodiment, there is provided a liquid crystal display device comprising: a first substrate; a second substrate; a facing area where the first substrate and the second substrate face each other; and a liquid crystal layer and a first spacer located between the first substrate and the second substrate. The facing area includes a first area for displaying an image, a second area located inside the first area in a planar view, and a frame-shaped frame area located between the first area and the second area and surrounding the second area. The second substrate includes a light-shielding layer formed in the frame area in a planar view. The second area is an area having higher transparency than transparency of the first area. The liquid crystal layer is located in the second area, the frame area, and the first area. The first spacer is located in the second area and is provided on the first substrate or the second substrate.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

Figure 1:
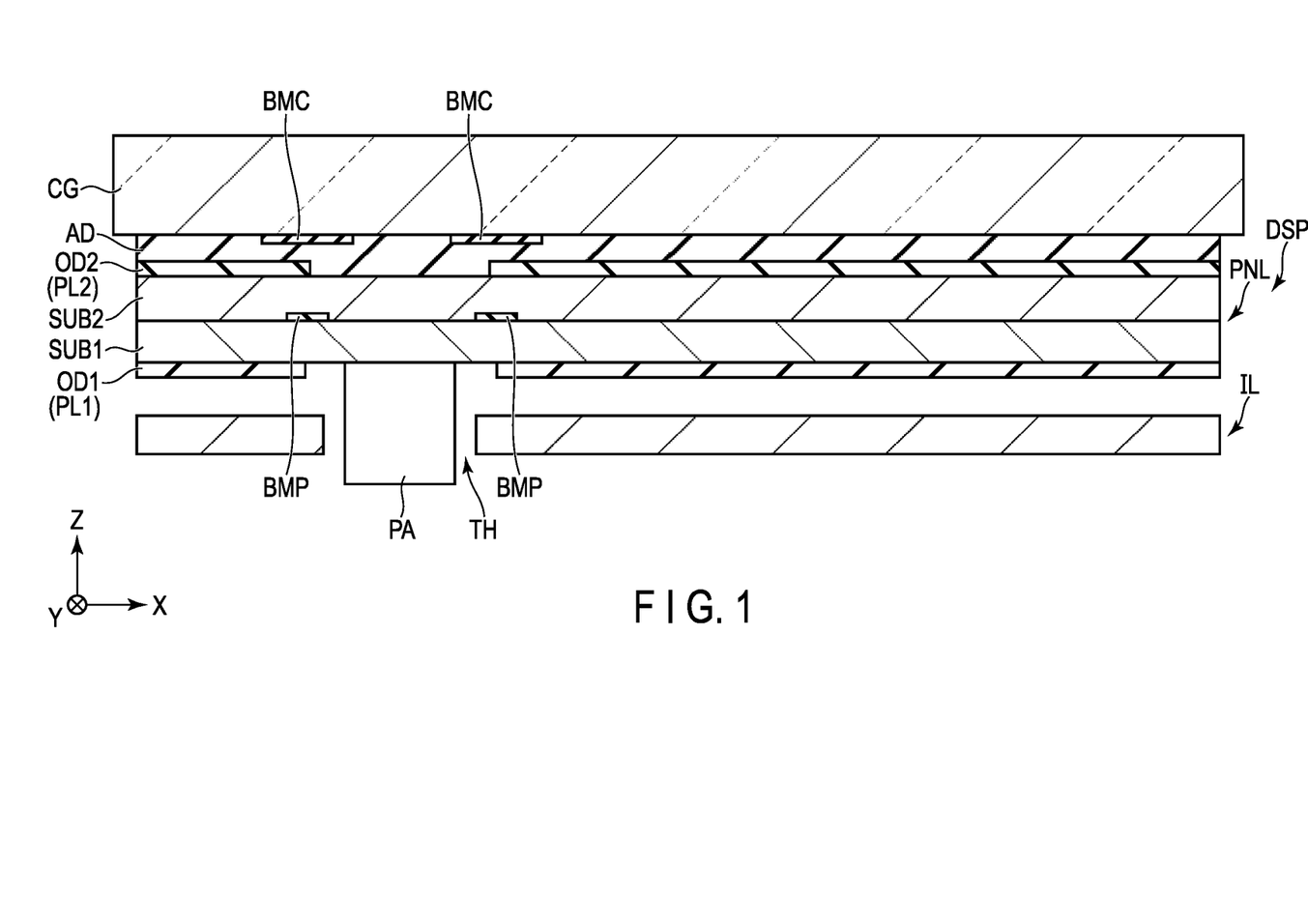
FIG. 1 is a sectional view of a liquid crystal display device according to an embodiment.

FIG. 1 is a sectional view of a liquid crystal display device DSP according to one embodiment. In this embodiment, a first direction X, a second direction Y and a third direction Z are orthogonal to each other, but they may intersect at an angle other than 90 degrees. In the following descriptions, a direction forwarding a tip of an arrow indicating the third direction Z is referred to as "upward" and a direction forwarding oppositely from the tip of the arrow is referred to as "downward". Further, viewing from above downward onto an X-Y plane defined by the first direction X and the second direction Y is referred to as planar view.

As illustrated in FIG. 1, the liquid crystal display device DSP includes a transparent substrate CG, a display panel PNL, an illumination device IL, and an electronic component PA. The transparent substrate CG, the display panel PNL, and the electronic component PA are arranged in this order in a third direction Z.

The display panel PNL includes a first substrate SUB1, a second substrate SUB2, an optical element OD1, and an optical element OD2.

A second substrate SUB2 includes a light-shielding layer BMP. The light-shielding layer BMP is located between the first substrate SUB1 and the second substrate SUB2. The optical element OD1 including a polarizer PL1 is bonded to the first substrate SUB1. The optical element OD2 including a polarizer PL2 is bonded to the second substrate SUB2. The optical elements OD1 and OD2 each have a through hole at a position overlapping the electronic component PA in the third direction Z. Note that the optical elements OD1 and OD2 may include a retardation film, a diffusion layer, an antireflective layer, and the like as necessary.

The transparent substrate CG is bonded to the display panel PNL by a transparent adhesive layer AD. The transparent substrate CG includes a light-shielding layer BMC. In the example illustrated, the light-shielding layer BMC is provided on a lower surface of the transparent substrate CG and overlaps the light-shielding layer BMP in the third direction Z. The transparent substrate CG is a glass substrate, a flexible resin substrate, or the like.

The illumination device IL illuminates the display panel PNL. In the example illustrated, the illumination device IL has a through hole TH overlapping the electronic component PA in the third direction Z.

The electronic component PA is a photoreceiver PA in the present embodiment, and the photoreceiver PA is, for example, a camera. Note that, for example, the photoreceiver PA may be a photoreceiver that detects visible light, a photoreceiver that detects infrared light, a proximity sensor that senses an approach of a detection target, a detection element that detects infrared light reflected from the detection target, or a combination thereof. The photoreceiver PA is inserted into the through hole TH of the illumination device IL. The photoreceiver PA receives light through the transparent substrate CG, the transparent adhesive layer AD, or the display panel PNL in the third direction Z.

Figure 2:
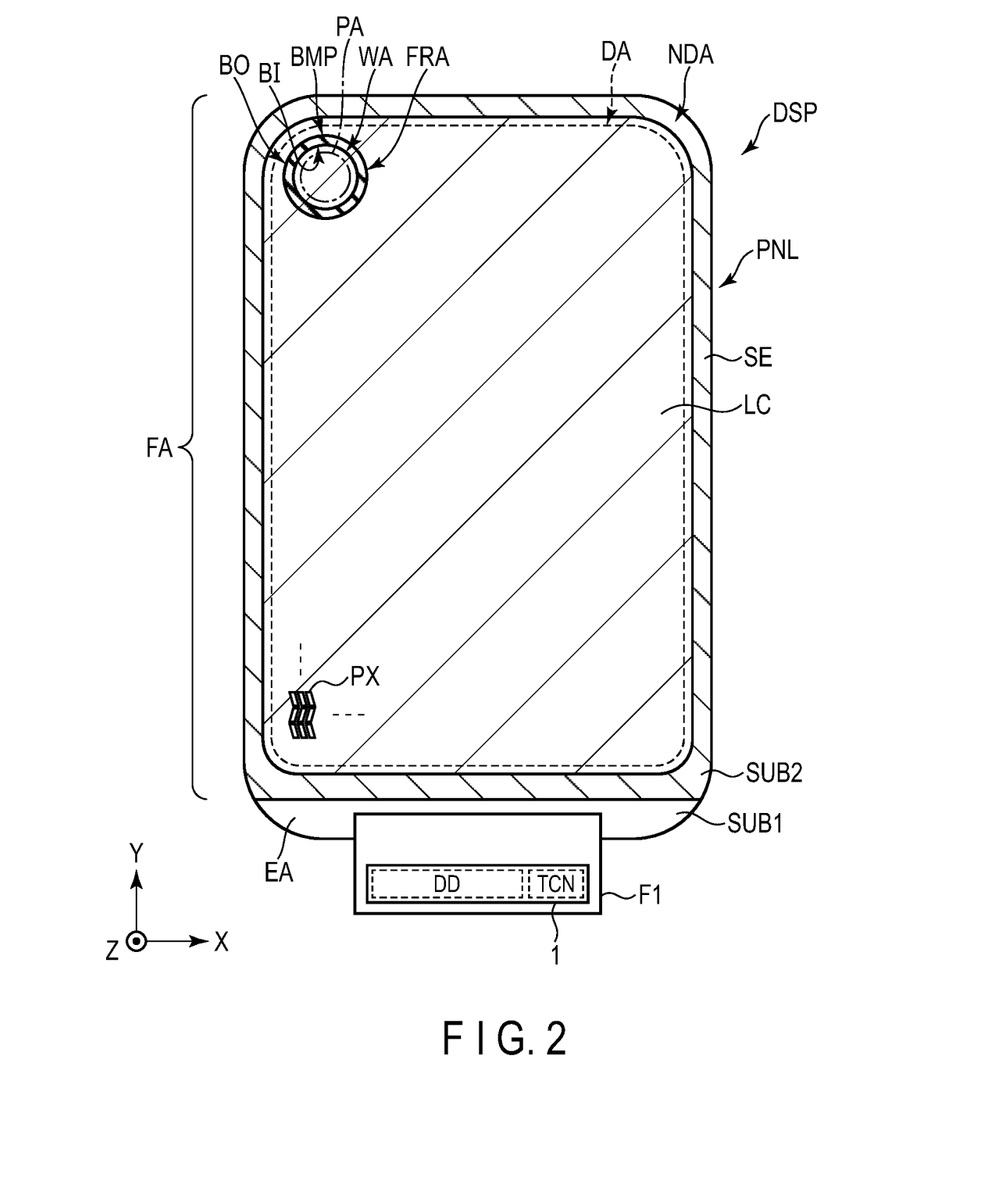
FIG. 2 is a plan view of the liquid crystal display device illustrated in FIG. 1.

FIG. 2 is a plan view of the liquid crystal display device DSP illustrated in FIG. 1.

As illustrated in FIG. 2, the liquid crystal display device DSP further includes a wiring substrate F1 and an IC chip 1.

The display panel PNL has a facing area FA and an extended area EA arranged in the second direction Y. The facing area FA is an area where the first substrate SUB1 and the second substrate SUB2 face each other and overlap each other, and is a two layer portion of the display panel PNL. The extended area EA can also be referred to as one sheet portion of the display panel PNL in which the first substrate SUB1 is exposed from the second substrate SUB2.

The facing area FA includes a display area DA for displaying an image, a frame-shaped non-display area NDA surrounding the display area DA, a window area WA, and a frame area FRA. The window area WA is located inside the display area DA in a planar view. In the example illustrated, the window area WA is a perfect circle, but may be another circle such as an ellipse or a polygon other than a circle. The frame area FRA is located between the display area DA and the window area WA, and is a frame-shaped area surrounding the window area WA. In addition, the display area DA may be referred to as a first area, and the window area WA may be referred to as a second area.

In the display area DA, a plurality of pixels PX disposed in a matrix form in a first direction (row direction) X and the second direction (column direction) Y are located. The pixels PX are not provided in the window area WA and the frame area FRA. Here, a pixel PX indicates a minimum unit that can be individually controlled according to a pixel signal, and may be referred to as a sub-pixel. The pixel PX is, for example, any of a red pixel exhibiting red, a green pixel exhibiting green, a blue pixel exhibiting blue, and a white pixel exhibiting white.

The photoreceiver PA is located inside the window area WA in a planar view. The through hole TH illustrated in FIG. 1 overlaps the window area WA. The light-shielding layer BMP is provided in the entire frame area FRA. The light-shielding layer BMP has an inner surface BI and an outer surface BO. The inner surface BI corresponds to a boundary between the window area WA and the frame area FRA, and the outer surface BO corresponds to a boundary between the frame area FRA and the display area DA.

The IC chip 1 and the wiring substrate F1 may read a signal from the display panel PNL, but mainly function as a signal source that supplies a signal to the display panel PNL. The IC chip 1 is mounted on the wiring substrate F1 and electrically connected to the wiring substrate F1. Note that the IC chip 1 may be mounted in the extended area EA and electrically connected to the extended area EA. The IC chip 1 incorporates a display driver DD that outputs a signal necessary for image display in an image display mode for displaying an image. In addition, in the example illustrated, the IC chip 1 incorporates a touch controller TCN that controls a touch sensing mode for detecting an approach or a contact of an object on the display device DSP. In the figure, the display driver DD and the touch controller TCN are illustrated by dashed lines. The wiring substrate F1 is a bendable flexible printed circuit.

The display panel PNL further includes a liquid crystal layer LC and a sealant SE. The sealant SE is located in the non-display area NDA and joins the first substrate SUB1 and the second substrate SUB2. The liquid crystal layer LC is held between the first substrate SUB1 and the second substrate SUB2, and is sealed by the sealant SE. The liquid crystal layer LC is provided over each of the window area WA, the frame area FRA, and the display area DA. In FIG. 2, the liquid crystal layer LC and the sealant SE are indicated by different oblique lines.

Although the detailed configuration of the display panel PNL will not be described here, the display panel PNL may have any configuration corresponding to a display mode using a lateral electric field along a main surface of the substrate, a display mode using a longitudinal electric field along a normal line of the main surface of the substrate, a display mode using an inclined electric field inclined in an oblique direction with respect to the main surface of the substrate, or a display mode using an appropriate combination of the lateral electric field, the longitudinal electric field, and the inclined electric field. Here, the main surface of the substrate is a surface parallel to the X-Y plane defined by the first direction X and the second direction Y.

Figure 3:
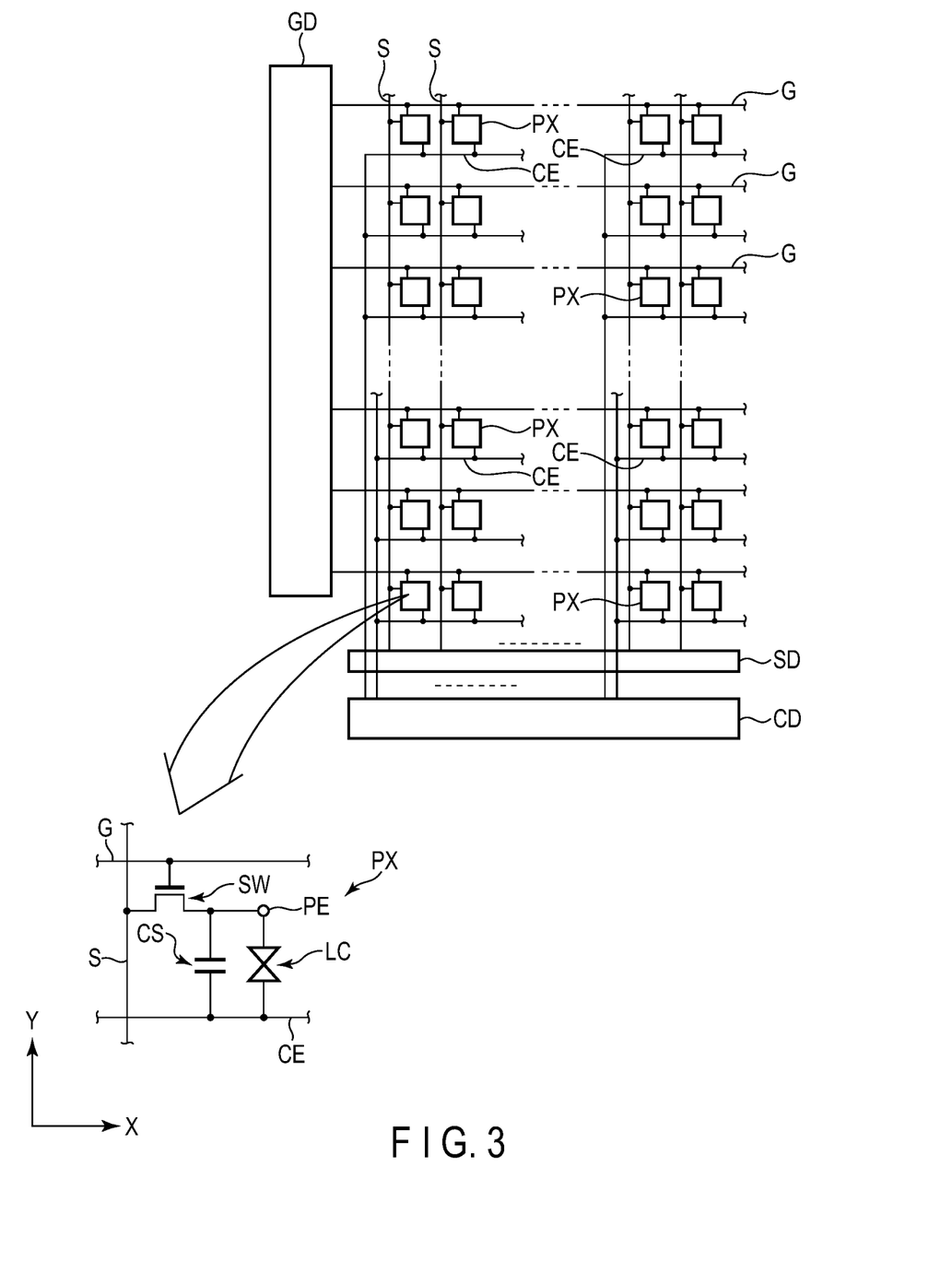
FIG. 3 is a diagram illustrating a basic structure and an equivalent circuit of pixels illustrated in FIG. 2.

FIG. 3 is a diagram illustrating a basic structure and an equivalent circuit of pixels illustrated in FIG. 2.

As illustrated in FIG. 3, a plurality of scanning lines G are connected to a scanning line driving circuit GD, and a plurality of signal lines S are connected to a signal line driving circuit SD. Each of the scanning lines G and each of the signal lines S are formed of a metal material such as aluminum (Al), titanium (Ti), silver (Ag), molybdenum (Mo), tungsten (W), copper (Cu), or chromium (Cr), or an alloy obtained by combining these metal materials. Each of the scanning lines G and the signal lines S may have a single-layer structure or a multilayer structure. Note that the scanning lines G and the signal lines S do not necessarily extend linearly, and some of them may be bent.

A common electrode CE is disposed over the plurality of pixels PX. The common electrode CE is connected to a voltage supply unit CD, and the touch controller TCN illustrated in FIG. 2. In the image display mode, the voltage supply unit CD supplies a common voltage (Vcom) to the common electrode CE. In the touch sensing mode, the touch controller TCN supplies a touch driving voltage different from the common voltage to the common electrode CE.

Each of the pixels PX includes a switching element SW, a pixel electrode PE, a common electrode CE, a liquid crystal layer LC, and the like. The switching element SW includes, for example, a thin film transistor (TFT), and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y. A control signal for controlling the switching element SW is supplied to the scanning line G. A video signal is supplied to the signal line S as a signal different from the control signal. The pixel electrode PE is electrically connected to the switching element SW. The liquid crystal layer LC is driven by an electric field generated between the pixel electrodes PE and the common electrode CE. A capacitance CS is formed, for example, between an electrode having a same electric potential as that of the common electrode CE and an electrode having a same electric potential as that of the pixel electrode PE.

Figure 4:
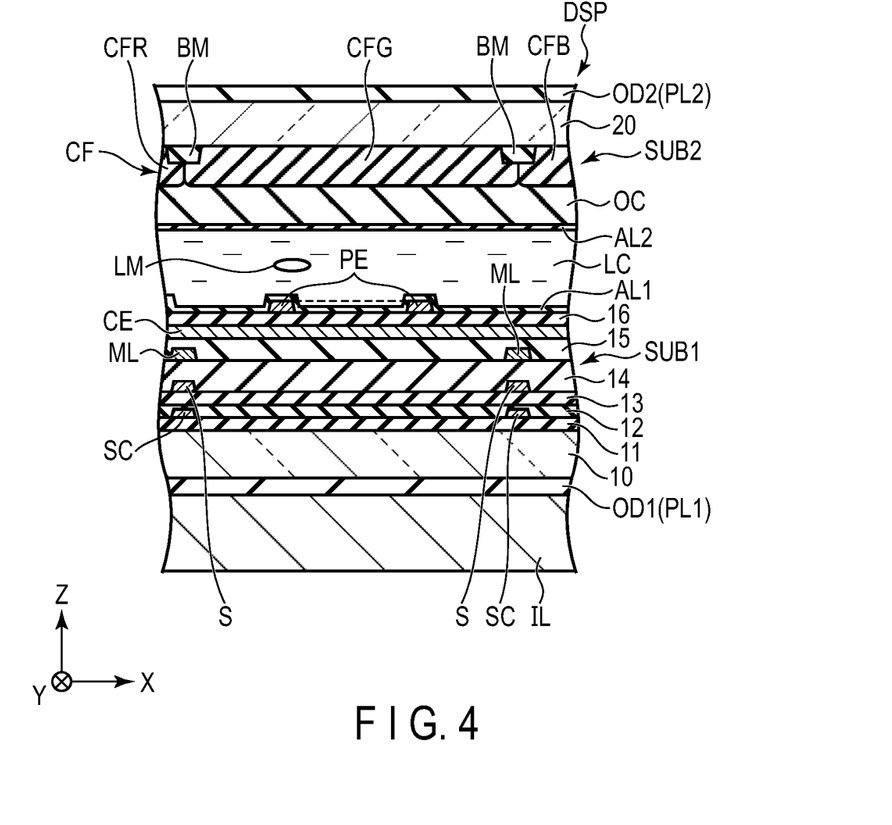
FIG. 4 is a sectional view illustrating a configuration example of the liquid crystal display device illustrated in FIG. 1.

FIG. 4 is a sectional view illustrating a configuration example of the liquid crystal display device DSP illustrated in FIG. 1. The example illustrated corresponds to an example in which a fringe field switching (FFS) mode, which is one of display modes using a lateral electric field, is applied.

As illustrated in FIG. 4, the first substrate SUB1 includes an insulating substrate 10, an insulating layers 11 to 16, a semiconductor layer SC, the signal lines S, metal lines ML, the common electrode CE, the pixel electrodes PE, an alignment film AL1, and the like. The insulating substrate 10 is a transparent substrate such as a glass substrate or a flexible resin substrate. The insulating layer 11 is located on the insulating substrate 10. The semiconductor layer SC is located on the insulating layer 11 and covered with the insulating layer 12. The semiconductor layer SC is formed of, for example, polycrystalline silicon, but may be formed of amorphous silicon or an oxide semiconductor. The insulating layer 12 is covered with the insulating layer 13. The scanning lines G illustrated in FIG. 3 are located between the insulating layers 12 and 13. The signal lines S are located on the insulating layer 13 and covered with an insulating layer 14. The metal lines ML are located on the insulating layer 14 and covered with an insulating layer 15. The metal lines ML are formed of, for example, a metal material such as aluminum (Al), titanium (Ti), silver (Ag), molybdenum (Mo), tungsten (W), copper (Cu), or chromium (Cr), or an alloy obtained by combining these metal materials. The metal lines ML may have a single-layer structure or a multilayer structure. Each of the metal lines ML extends in parallel with each signal line S and is located immediately above the signal line S.

The common electrode CE is located on the insulating layer 15 and covered with an insulating layer 16. The pixel electrodes PE are located on the insulating layer 16 and covered with the alignment film AL1. Each of the pixel electrodes PE faces the common electrode CE through the insulating layer 16. The common electrode CE and the pixel electrodes PE are formed of, for example, a transparent conductive material such as indium tin oxide (ITO) or indium zinc oxide (IZO). The pixel electrodes PE are linear electrodes, and the common electrode CE is plate-like electrode commonly provided over the plurality of pixels PX. The pixel electrodes PE may be plate-like electrodes, and a linear common electrode may be provided between each of the pixel electrodes PE and the liquid crystal layer LC.

The insulating layer 11, the insulating layer 12, and the insulating layers 13 and 16 are inorganic insulating layers formed of an inorganic insulating material such as silicon oxide (SiO), silicon nitride (SiN), or silicon oxynitride (SiON). The insulating layer 16 is formed of, for example, SiN. The insulating layer 11, the insulating layer 12, and the insulating layers 13 and 16 may have a single-layer structure or a multilayer structure. The insulating layers 14 and 15 are, for example, organic insulating layers formed of an organic insulating material such as an acrylic resin.

The second substrate SUB2 includes an insulating substrate 20, a colored layer CF, light-shielding layers BM, a transparent layer OC, and an alignment film AL2. The insulating substrate 20 is a transparent substrate such as a glass substrate or a flexible resin substrate. The colored layer CF, the light-shielding layers BM, and the transparent layer OC are located between the insulating substrate 20 and the liquid crystal layer LC. The alignment film AL2 is in contact with the liquid crystal layer LC. The alignment films AL1 and AL2 are formed of, for example, a material having a horizontal alignment property. The transparent layer OC covers the colored layer CF and the light-shielding layers BM. The transparent layer OC is, for example, a transparent organic insulating layer. In the example illustrated, the colored layer CF is provided in the second substrate SUB2, but may be provided in the first substrate SUB1. The colored layer CF includes red layers CFR, green layers CFG, and blue layers CFB. The green layer CFG faces the pixel electrode PE. The red layer CFR and the blue layer CFB also face other pixel electrodes PE (not illustrated).

The liquid crystal layer LC is held between the first substrate SUB1 and the second substrate SUB2, and is held between the alignment film AL1 and the alignment film AL2. The liquid crystal layer LC includes liquid crystal molecules LM. The liquid crystal layer LC is made of a positive type (positive dielectric anisotropy) liquid crystal material or a negative type (negative dielectric anisotropy) liquid crystal material.

In such a display panel PNL, in an off state in which no electric field is formed between the pixel electrode PE and the common electrode CE, the liquid crystal molecules LM are initially aligned in a predetermined direction between the alignment films AL1 and AL2. In such an off state, an illumination light emitted from the illumination device IL toward the display panel PNL is absorbed by the optical elements OD1 and OD2 and provides dark display. On the other hand, in an ON state in which an electric field is formed between the pixel electrode PE and the common electrode CE, the liquid crystal molecules LM are aligned in a direction different from the initial alignment direction by the electric field, and the alignment direction is controlled by the electric field. In such an ON state, a part of the illumination light from the illumination device IL is transmitted through the optical elements OD1 and OD2 and provides bright display.

Figure 5:
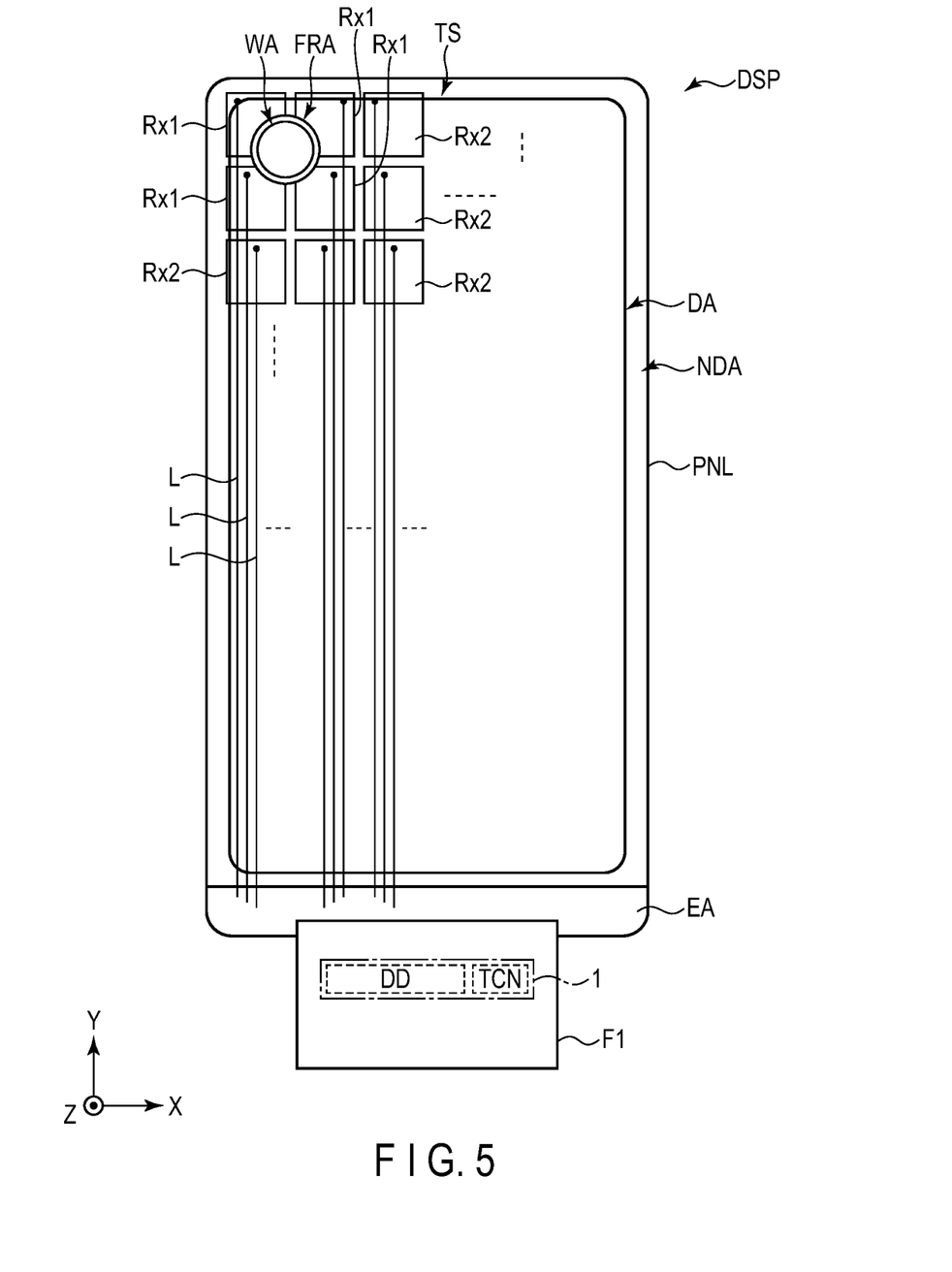
FIG. 5 is a plan view illustrating a configuration example of a touch sensor included in the liquid crystal display device illustrated in FIG. 2.

FIG. 5 is a plan view illustrating a configuration example of a touch sensor TS included in the liquid crystal display device DSP illustrated in FIG. 2. Here, the self-capacitive touch sensor TS will be described, but the touch sensor TS may be a mutual capacitive touch sensor TS.

As illustrated in FIG. 5, the touch sensor TS includes a plurality of electrodes Rx (Rx1, Rx2, . . . ) and a plurality of sensor lines L. The plurality of electrodes Rx are located in the display area DA, and are disposed in a matrix in the first direction X and the second direction Y. The electrodes Rx are not provided in the window area WA. In the example illustrated, the electrodes Rx2 each have a square shape, but the electrodes Rx1 disposed around the window area WA each have a shape along the window area WA. The plurality of sensor lines L extend in the second direction Y and are arranged in the first direction X in the display area DA. Each of the sensor lines L is provided at a position overlapping with the respective signal line S described above. In addition, each of the sensor lines L is drawn out to the extended area EA and is electrically connected to the IC chip 1 via the wiring substrate F1. Each of the sensor lines L is electrically connected to one electrode Rx. Note that one electrode Rx and a plurality of sensor lines L may be electrically connected.

In the touch sensing mode, the touch controller TCN applies the touch driving voltage to the sensor lines L. As a result, the touch driving voltage is applied to electrodes Rx, and sensing is performed on the electrodes Rx. A sensor signal corresponding to a result of the sensing at the electrodes Rx is output to the touch controller TCN via the sensor lines L.

In the display mode, the electrodes Rx function as the common electrode CE to which the common voltage (Vcom) is applied. In the embodiment, the common electrode CE includes the electrodes Rx. The common voltage is applied from, for example, a voltage supply unit included in the display driver DD via the sensor lines L. The metal lines ML illustrated in FIG. 4 function as the sensor lines L.

Figure 6:
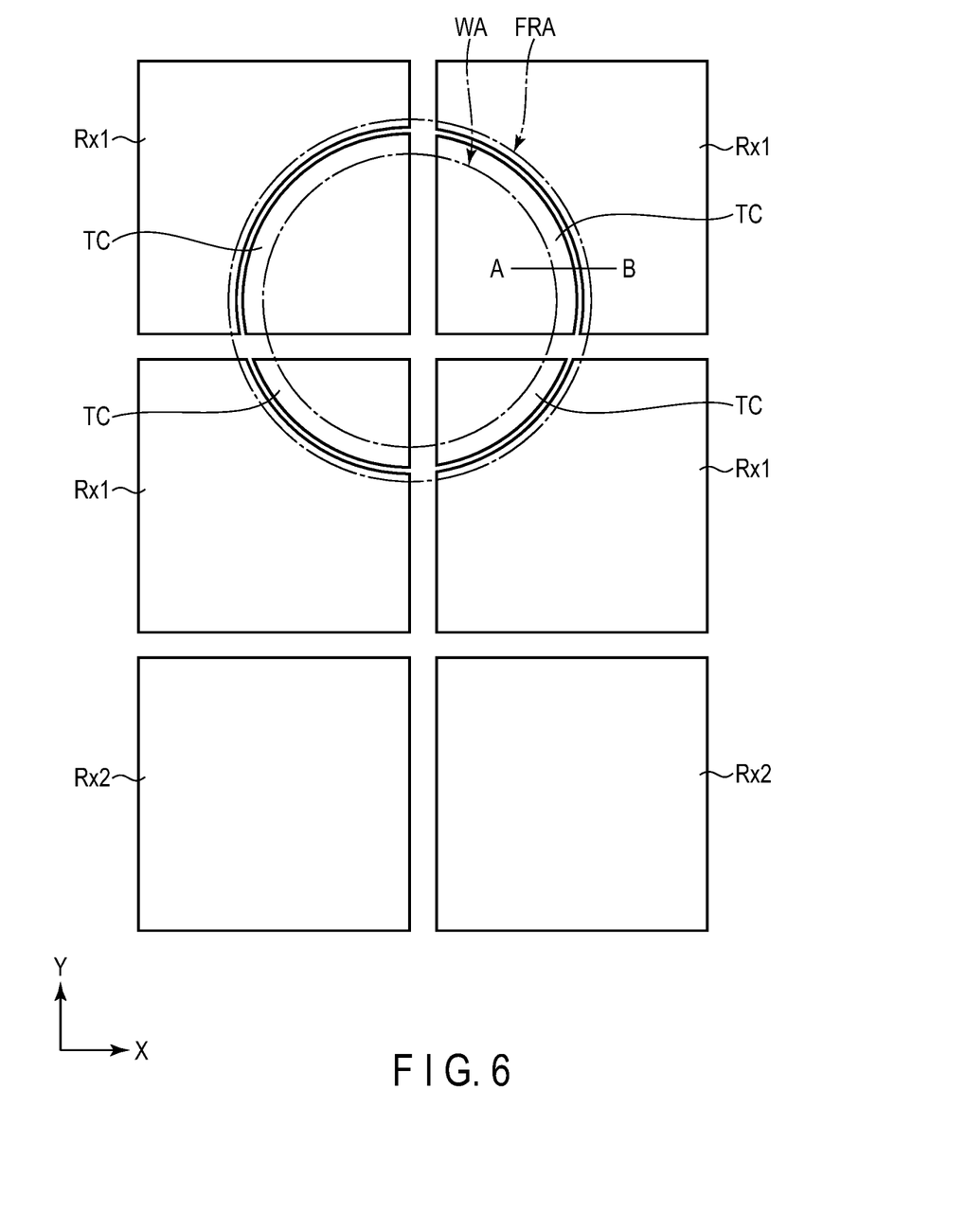
FIG. 6 is an enlarged plan view of a window area illustrated in FIG. 5.

FIG. 6 is an enlarged plan view of the window area WA illustrated in FIG. 5.

As illustrated in FIG. 6, the liquid crystal display device DSP further includes a plurality of transparent conductive layers TC. The transparent conductive layers TC are formed of a same material as the pixel electrodes PE illustrated in FIG. 4. The transparent conductive layers TC are provided over the frame area FRA and the window area WA. Each of the transparent conductive layers TC is separated from each other, and is connected to a different electrode Rx1 in the frame area FRA through a contact hole CH described later.

In a case where the electrodes Rx are caused to function as sensor electrodes in the touch sensing mode, each area of the electrodes Rx are preferably equal to each other. An area of the electrode Rx1 overlapping the window area WA is smaller than an area of the electrode Rx2 not overlapping the window area WA. However, by electrically connecting the electrode Rx1 and the transparent conductive layer TC, the electrode Rx1 and the transparent conductive layer TC function as one sensor electrode. A total value of the area of the electrode Rx1 and an area of the transparent conductive layer TC connected to the electrode Rx1 is substantially equal to the area of the electrode Rx2. Therefore, it is possible to suppress a decrease in touch sensing accuracy in a vicinity of the window area WA.

Figure 7:
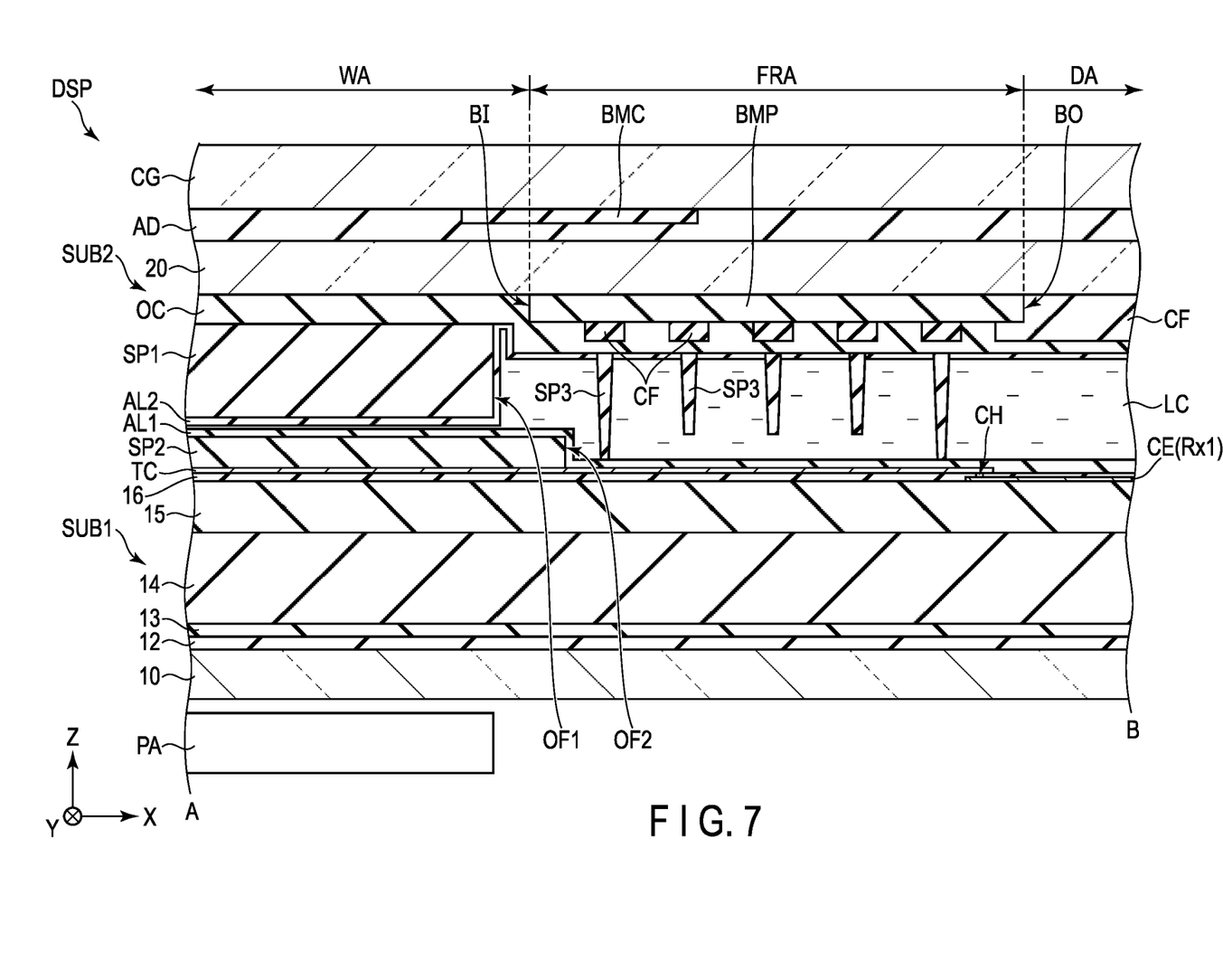
FIG. 7 is a sectional view of the liquid crystal display device taken along line A-B illustrated in FIG. 6.

FIG. 7 is a sectional view of the liquid crystal display device DSP taken along line A-B illustrated in FIG. 6.

As illustrated in FIG. 7, the transparent conductive layer TC is located on the insulating layer 16 and covered with the alignment film AL1. The transparent conductive layer TC is connected to the common electrode CE through a contact hole CH penetrating the insulating layer 16. In the example illustrated, there is one contact hole CH, but a plurality of contact holes CH may be formed in an area where the transparent conductive layer TC and the common electrode CE overlap in the frame area FRA. The transparent conductive layer TC may be connected to the common electrode CE through a plurality of contact holes CH. In the example illustrated, the transparent conductive layer TC is in contact with the insulating layer 16 and the alignment film AL1 in the frame area FRA, and is in contact with the insulating layer 16 and a spacer SP2 in the window area WA.

The light-shielding layer BMP is provided on a lower surface of the insulating substrate 20. In the example illustrated, the outer surface BO of the light-shielding layer BMP is covered with the colored layer CF, and the inner surface BI is located below the light-shielding layer BMC. A plurality of colored layers CF are located between the light-shielding layer BMP and the transparent layer OC in the frame area FRA.

The liquid crystal display device DSP further includes a plurality of spacers SP (SP1, SP2, . . . ) located between first substrate SUB1 and second substrate SUB2. The spacers SP are formed of, for example, a member that transmits light. Spacers SP1 and SP3 are provided on the second substrate SUB2, and the spacer SP2 is provided on the first substrate SUB1.

One spacer SP1 is located in the window area WA. The spacer SP1 is provided on a lower surface of the transparent layer OC and covered with the alignment film AL2. The spacer SP1 has an outer peripheral surface OF1 located below the light-shielding layer BMC.

One spacer SP2 is located in the window area WA and the frame area FRA. The spacer SP2 is in contact with the transparent conductive layer TC and covered with the alignment film AL1. The spacer SP2 has an outer peripheral surface OF2 located below the light-shielding layer BMC.

The spacer SP1 and the spacer SP2 face each other. The spacers SP1 and SP2 are provided substantially throughout the window area WA. The inner surface BI of the light-shielding layer BMP is located between the outer peripheral surface OF1 and the outer peripheral surface OF2. The liquid crystal layer LC extends between the spacer SP1 and the spacer SP2.

A plurality of spacers SP3 are located in the frame area FRA. Each of the spacers SP3 faces the respective colored layers CF, and is located between the transparent layer OC and the first substrate SUB1. The plurality of spacers SP3 are for maintaining a cell gap between the first substrate SUB1 and the second substrate SUB2 in the frame area FRA. The plurality of spacers SP3 include main spacers in contact with the first substrate SUB1 and sub-spacers not in contact with the first substrate SUB1 in a steady state where no external stress is applied to the display panel PNL.

In the window area WA of the display panel PNL, members that shield light, such as the metal lines ML and the colored layers CF, are not provided, and only members that transmit light, such as the insulating layers, the spacers SP, and the transparent layer OC, are provided. The liquid crystal molecules of the liquid crystal layer LC located in the window area WA transmit light in a state where no electric field is applied, for example. Thus, the photoreceiver PA located in the window area WA can receive light through each of the transparent substrate CG and the display panel PNL.

As described above, the window area WA overlaps the camera as the photoreceiver PA, and the window area WA is required to have transparency that does not hinder imaging of the camera. In addition to the metal lines ML and the colored layers CF, the switching element SW constituting the thin film transistor, the scanning lines G, and the signal lines S are not provided in the window area WA as members that shield light, and the window area WA may be referred to as a high light transmission area WA or a high transparent area WA having a higher light transmittance (high transparency) than the display area DA.

The high light transmission area WA may be an area having a higher light transmittance than the display area DA, and a light shielding member such as metal lines ML may be provided as long as the function of the photoreceiver PA including the camera is not hindered. Furthermore, both of the optical elements OD1 and OD2 illustrated in FIG. 1 do not have to form respective through holes in the high light transmission areas WA, and may form a through hole in only one of the optical element OD1 and the optical element OD2. Even in this case, the high light transmission area WA has higher light transmittance than that of the display area DA. It is needless to say that it is more appropriate not to provide a metal line, a polarizer including two optical elements, or the like, which can inhibit light transmission, in the high light transmission area WA as illustrated in FIG. 1.

According to the present embodiment, since one spacer SP1 and one spacer SP2 are provided substantially in the entire window area WA, the cell gap between the first substrate SUB1 and the second substrate SUB2 can be maintained in the window area WA. Therefore, when external stress is applied to the window area WA of the display panel PNL, it is possible to suppress the occurrence of non-uniformity of the cell gap between the window area WA and other areas (the frame area FRA and the display area DA). Furthermore, in a case where a plurality of spacers SP1 and a plurality of spacers SP2 are provided in the window area WA, there is a possibility that light transmitted through the window area WA is reflected by the plurality of spacers SP1 and the plurality of spacers SP2 and is visually recognized, or a possibility that transmittance of light in the window area WA decreases. In the present embodiment, since only one spacer SP1 and one spacer SP2 are provided in the window area WA, the above problem can be suppressed, and the product yield of the liquid crystal display device DSP can be improved.

In addition, as compared with a case where a through hole is provided in the window area WA of the display panel PNL in order for the photoreceiver PA to receive light, it is not necessary to dispose a through hole in the window area WA, and it is not necessary to dispose a sealant for sealing the liquid crystal layer LC around the through hole in order to provide the through hole, so that the manufacturing process can be simplified and a frame of the frame area FRA can be narrowed.

The transparent conductive layer TC is provided between the alignment film AL1 and the inorganic insulating layer 16 in the frame area FRA. Since an adhesive strength between the alignment film AL1 and the transparent conductive layer TC is stronger than an adhesive strength between the alignment film AL1 and the inorganic insulating layer 16, peeling of the alignment film AL1 in the frame area FRA can be suppressed.

In the configuration example described above, the insulating layer 16 corresponds to an inorganic insulating layer, the insulating layer 14 corresponds to a first organic insulating layer, the insulating layer 15 corresponds to a second organic insulating layer, the spacer SP1 corresponds to a first spacer, the spacer SP2 corresponds to a second spacer, and the spacer SP3 corresponds to a third spacer.

Figure 8:
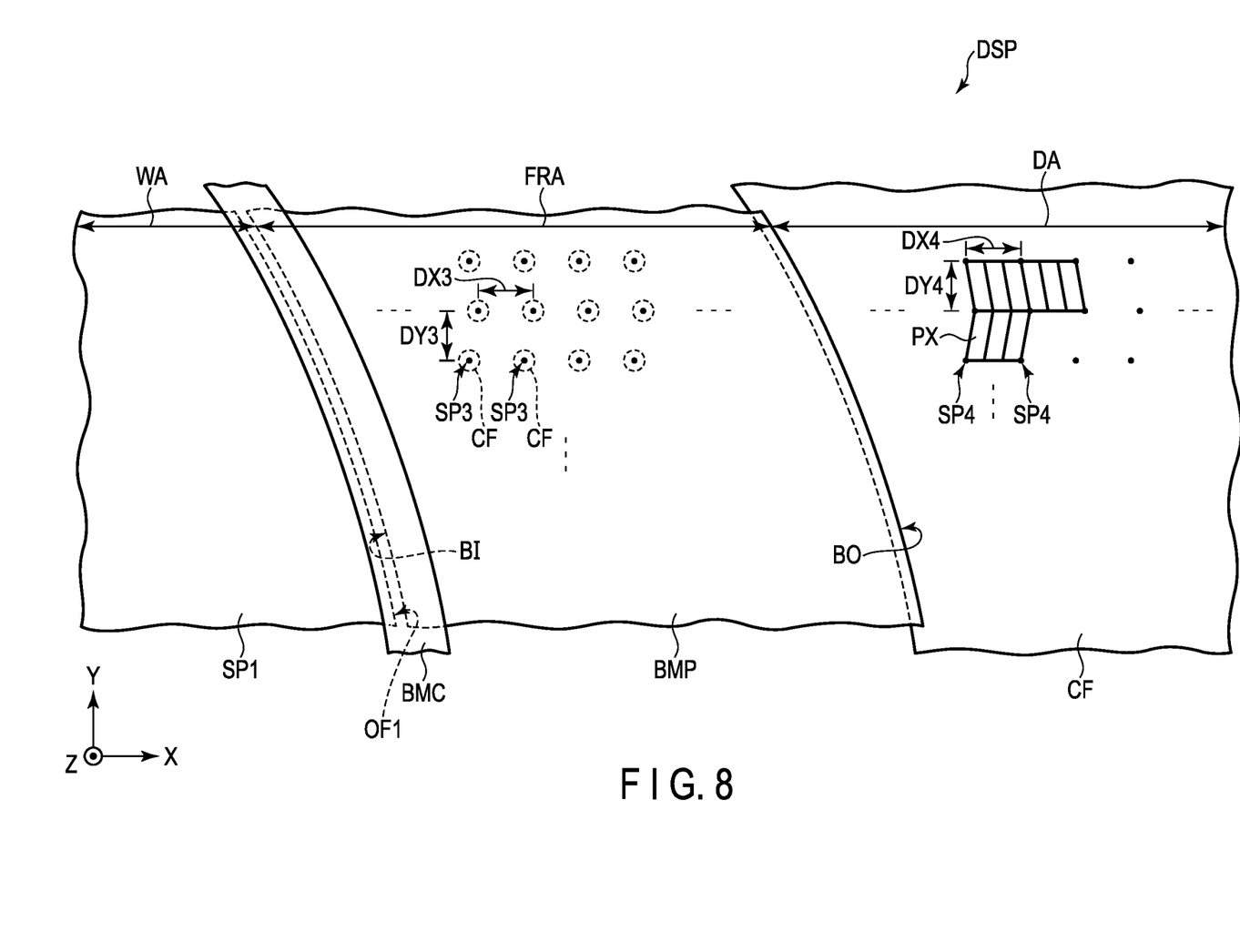
FIG. 8 is a plan view of the above-described liquid crystal display device, and is a view for explaining a positional relationship between spacers.

FIG. 8 is a plan view of the liquid crystal display device DSP, and is a view for describing a positional relationship between the spacers SP.

As illustrated in FIG. 8, the plurality of spacers SP3 are scattered in the frame area FRA, and a plurality of spacers SP4 are scattered in the display area DA.

The plurality of spacers SP4 are located in the display area DA. Each of the spacers SP4 is provided, for example, at a position where the scanning line G and the signal line S illustrated in FIG. 3 overlap each other. The spacers SP4 are arranged at an interval DX4 in the first direction X, and are arranged at an interval DY4 in the second direction Y.

The spacers SP3 are arranged at an interval DX3 in the first direction X, and are arranged at an interval DY3 in the second direction Y. The interval DX3 and the interval DX4 are substantially equal, and the interval DY3 and the interval DY4 are substantially equal.

In the example illustrated, the colored layers CF are scattered in the frame area FRA and each of the colored layers CF is circular in a planar view.

Figure 9:
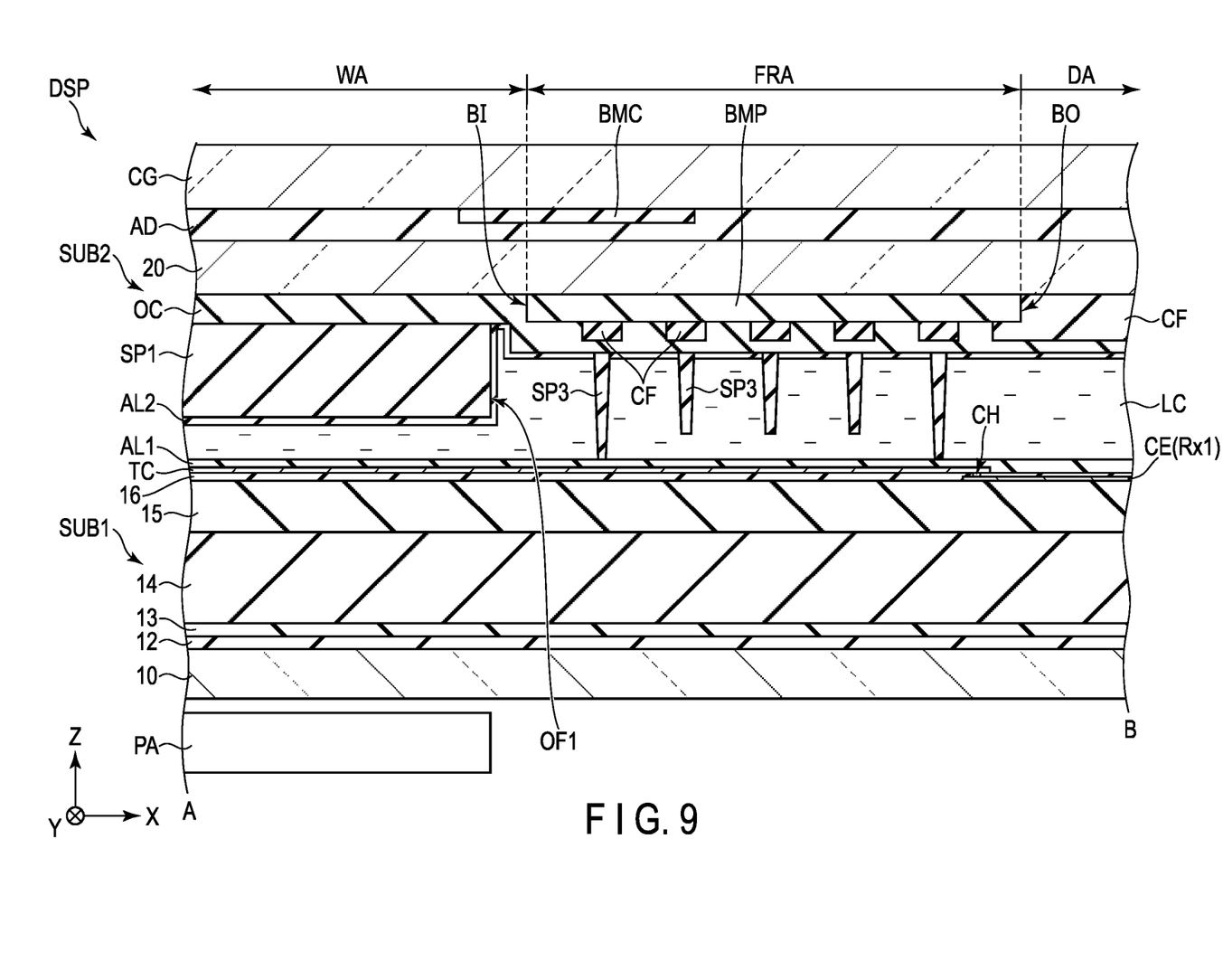
FIG. 9 is a sectional view illustrating a modified example of the liquid crystal display device illustrated in FIG. 7.

FIG. 9 is a sectional view illustrating a modified example of the liquid crystal display device DSP illustrated in FIG. 7.

As illustrated in FIG. 9, the present modified example is different from the configuration example illustrated in FIG. 7 in that the spacer SP2 is not disposed. The alignment film AL1 is in contact with the transparent conductive layer TC in the window area WA and the frame area FRA. In the example illustrated, the spacer SP1 is provided on the second substrate SUB2, but the spacer SP1 may be provided on the first substrate SUB1.

Even in this modified example, the same effect as described above can be obtained. In addition, in the window area WA, the transparent conductive layer TC is in contact with the alignment film AL1. This makes it possible to suppress peeling of the alignment film AL1 in the window area WA.

As described above, according to the present embodiment, it is possible to provide a liquid crystal display device capable of improving a product yield.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:

a first substrate;

a second substrate;

a facing area where the first substrate and the second substrate face each other;

a liquid crystal layer and a first spacer located between the first substrate and the second substrate; and a second spacer, wherein the facing area includes a first area for displaying an image, a second area located inside the first area in a planar view, and a frame-shaped frame area located between the first area and the second area and surrounding the second area, the second substrate includes a light-shielding layer formed in the frame area in a planar view, the second area is an area having higher transparency than transparency of the first area, the liquid crystal layer is located in the second area, the frame area, and the first area, the first spacer is located in the second area and is provided on the second substrate, the second spacer is provided on the first substrate, is located between the first substrate and the second substrate, and faces the first spacer in the second area, the second spacer is located in the second area and is not located in the first area, the first substrate further includes a common electrode in the first area and the frame area, an inorganic insulating layer that covers the common electrode, a transparent conductive layer formed above the inorganic insulating layer in the second area and the frame area, an alignment film formed above the transparent conductive layer, a first organic insulating layer, a metal line formed above the first organic insulating layer, and a second organic insulating layer formed above the first organic insulating layer and the metal line, the transparent conductive layer is in contact with each of the inorganic insulating layer and the alignment film, the inorganic insulating layer includes a contact hole that penetrates in the frame area, the common electrode is located above the second organic insulating layer and is electrically connected to the metal line, the transparent conductive layer is connected to the common electrode through the contact hole, and the second spacer is in contact with the transparent conductive layer and is covered with the alignment film.

2. The liquid crystal display device according to claim 1, further comprising an illumination device, wherein the illumination device has a through hole at a position overlapping the second area.

3. The liquid crystal display device according to claim 2, further comprising a plurality of third spacers provided on the second substrate in the frame area, wherein the second substrate further includes, in the frame area, a transparent layer facing the liquid crystal layer and a colored layer located between the transparent layer and the light-shielding layer, and each of the plurality of third spacers faces the colored layer and is located between the transparent layer and the first substrate.

4. The liquid crystal display device according to claim 2, further comprising a photoreceiver located in the second area, wherein the photoreceiver is inserted into the through hole of the illumination device.

5. The liquid crystal display device according to claim 1, further comprising a plurality of third spacers provided on the second substrate in the frame area, wherein the second substrate further includes, in the frame area, a transparent layer facing the liquid crystal layer and a colored layer located between the transparent layer and the light-shielding layer, and each of the plurality of third spacers faces the colored layer and is located between the transparent layer and the first substrate.

6. The liquid crystal display device according to claim 1, wherein the second spacer is located in the frame area.

7. The liquid crystal display device according to claim 1, wherein the first spacer and the second spacer are provided substantially throughout the second area.

8. The liquid crystal display device according to claim 1, wherein an outer diameter of the first spacer is smaller than an outer diameter of the second spacer in a planar view, and an inner surface of the light-shielding layer is located between an outer peripheral surface of the first spacer and an outer peripheral surface of the second spacer in a planar view.

* * * * *